United States Patent Office 3,655,623
Patented Apr. 11, 1972

3,655,623
SEGMENTED POLYURETHANES DERIVED FROM
2,5-DIISOPROPYL-p-XYLENE DIISOCYANATE
Elmore L. Martin, Wilmington, Del., assignor to E. I. du
Pont de Nemours and Company, Wilmington, Del.
No Drawing. Original application Dec. 30, 1966, Ser. No.
605,967, now Patent No. 3,542,839. Divided and this
application June 16, 1970, Ser. No. 46,816
Int. Cl. C08g 22/22
U.S. Cl. 260—77.5 AT                  10 Claims

ABSTRACT OF THE DISCLOSURE

Segmented polyurethanes based on 2,5-diisopropyl-p-xylylene diisocyanate as capping reagent provide spandex fibers and films which exhibit high whiteness retention and high elastic power. The diisocyanate may be prepared from 2,5-diisopropyl-p-xylylenediamine.

CROSS-REFERENCE TO RELATED APPLICATION

The application is a divisional of my copending application Ser. No. 605,967, filed Dec. 30, 1966 and now U.S. Patent No. 3,542,839.

BACKGROUND

This invention relates to a novel aromatic diisocyanate, to a novel aromatic diamine, to segmented polyurethanes derived from the diisocyanate, and to elastic filaments comprising the segmented polyurethanes.

As is well recognized in the textile industry, the term "spandex" is applied to elastic fibers in which at least 85% by weight of the fiber-forming polymeric material is a long-chain segmented polyurethane. More specifically, the polymer molecules of the segmented polyurethane may, according to the clasic definition, be considered as consisting essentially of 50 to 95% by weight of recurring amorphous or so-called "soft" segments and 5 to 50% by weight of recurring so-called "hard" segments, urethane linkages serving to join the segments together in the polymer molecular. The amorphous segments are each defined as the residue remaining after removal of the terminal functional groups from an amorphous polymer having a melting point below 60° C. and a molecular weight above 600. The hard segments comprise the remainder of the polymer molecules lying between the urethan linkages and contain at least one repeating unit of a nitrogen-containing polymer which in its fiber-forming molecular weight range has a melting point above about 200° C.

Elastic, segmented polymers prepared from polymeric glycols, aromatic diisocyanates and various chain-extenders are well known for the formation of spandex fibers having good fiber properties, such as high elastic modulus (elastic "power"). Because of the aromatic diisocyanates conventionally used, the products, however, have a tendency to yellow on exposure to light, and acid fumes, and chlorine. spandex fibers from aliphatic diisocyanates are known to be resistant to such yellowing, but unfortunately they have inferior elastic power as compared to the spandex fibers derived from aromatic diisocyanates.

SUMMARY

This invention provides a new diisocyanate and a new diamine. The diisocyanate is 2,5-diisopropyl-p-xylene diisocyanate. The diamine is 2,5-diisopropyl-p-xylylene-diamine. The diamine is useful as an intermediate in preparing the diisocyanate and also as a chain extender in making segmented polyurethanes. The diisocyanate is particularly useful in the formation of elastic filaments having a unique combination of high whiteness retention and high elastic power. The invention also provides segmented polyurethanes derived from the diisocyanate having good solubility in commercial solvents, thereby permitting the preparation of solutions of high concentration for the spinning of spandex filaments.

The segmented polyurethanes of this invention consist essentially of recurring units of the formula:

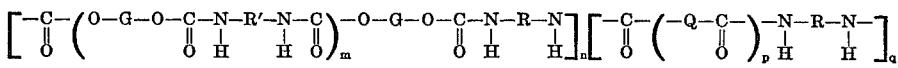

wherein

G is a long chain polymeric radical free from substituents reactive with isocyanate and having a molecular weight of at least 600;

R' is an organic radical containing more than one carbon atom and free from substituents reactive with isocyanate;

Q is a radical obtained by the removal of one hydrogen atom from each of two functional groups of a polyfunctional compound selected from the class consisting of organic polyamines containing at least two $NH_2$ groups each attached to separate carbon atoms not part of a benzenoid ring, hydrazine, hydrazides containing at least two

—NHNH$_2$ groups attached to carbonyl, and piperazines containing two >NH groups or two >N—$NH_2$ groups;

R is an organic radical containing more than one carbon atom and free from substituents reactive with isocyanate, at least 80 mol percent thereof in said recurring units being divalent radicals of the formula:

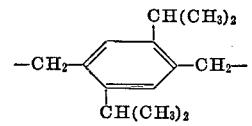

m is an integer selected from the class consisting of zero and small positive integers, i.e., from 1 to about 8;

n and q are small positive integers, i.e., from 1 to about 8; and p is an integer selected from the class consisting of zero and 1.

DESCRIPTION

As may be seen from the formula presented hereinabove, the segmented polymers consist of alternating first and second segments. The first segment contains the residue G which remains after removal of terminal hydroxyl groups from a hydroxyl-terminated polymer melting below 60° C. and having a molecular weight above 600. The second segment comprises at least one repeating unit of a nitrogen-containing polymer, such as urea or bis-ureylene polymer, having a melting point above about 200° C. in its fiber-forming molecular-weight range (i.e., above 10,000). As further explained hereinafter, the segmented polymers are obtained according to conventional polymerization techniques by first reacting a difunctional polymer having a molecular weight between 600 and about 5,000 and a molar excess of a polyisocyanate component. There is thus formed an isocyanate-terminated polymer, which is thereafter chain-extended by reaction with a compound containing more than one active hydrogen atom.

In the preparation of the segmented polymers, the difunctional polymer is preferably a polymeric glycol HO—G—OH having a molecular weight of at least 600. These polymeric glycols include the hydroxy-terminated polyethers, polyesters, copolyether-esters, polyacetals, polysiloxanes, and N-alkylated polyurethanes, all of which are well known in the art. Mixtures of these polymeric glycols may be used, thereby giving rise to a product in which the G groups in the formula will be different. From a standpoint of commercial availability, the preferred polymeric glycols for this invention are the polyether glycols, polyester glycols, and mixtures thereof.

The main group of suitable polyethers is the polyalkylene ethers, such as polyethylene glycol, polypropylene ether glycol, polytetramethylene ether glycol, polyhexamethylene ether glycol, etc. Mixtures of monomeric compounds may be used to prepare copolyethers. Some of the alkylene radicals in the polyether may be replaced by arylene or divalent cycloaliphatic radicals. The preferred polyether glycol is polytetramethylene ether glycol.

The polyester glycols may be prepared by reacting dibasic acids, esters, or acid halides with a molar excess of monomeric glycol, as is well known in the art. Suitable glycols are the polymethylene glycols, such as ethylene, trimethylene, pentamethylene, hexamethylene, decamethylene glycols; substituted polymethylene glycols, such as propylene glycol and 2-ethyl-2-methylpropanediol; and cyclic glycols, such as cyclohexanediol. These glycols may be reacted with the proper molar ratio of aliphatic cycloaliphatic, or aromatic acids or their ester-forming derivatives to produce low-molecular-weight polymers. Suitable acids for preparing polyesters and/or copolyesters include carbonic, adipic, sebacic, terephthalic, and hexahydroterephthalic acids. Mixtures of glycols and/or mixtures of acids or acid derivatives to form copolyesters may also be employed. The alkyl- and halogen-substituted derivatives of these acids may also be used. An ether-containing glycol such as triethylene glycol, may be used to produce polyetherester glycols. It will be apparent that polyester glycols derived from lactones or hydroxy acids may also be used.

Polymeric glycols having the desired combination of molecular weight and low melting point may be obtained by the use of copolymers or by interrupting the polymer chain with other linking groups. For example, a urethane-interrupted polymer may be conveniently made by reacting a polymeric glycol, such as a polyether glycol or a polyester glycol, with a molar deficiency of a diisocyanate. In such cases, a conventional, unsymmetrical diisocyanate OCN—R'—NCO of the prior art, such as tolylene diisocyanate, may be used as a coupling agent. In the case where no coupling diisocyanate is used, $m$ in the formula will have a value of zero. In cases where such a diisocyanate is used, R' is derived from this diisocyanate and $m$ will have a value greater than zero. Other polyisocyanates which may furnish the R' radical include m-phenylene diisocyanate, 4,4'-biphenylene diisocyanate, p,p'-methylenediphenyl diisocyanate, 4-chloro-1,3-phenylene diisocyanate, 1,5-naphthylene diisocyanate, tetramethylene diisocyanate, hexamethylene diisocyanate, decamethylene diisocyanate, cyclohexylene diisocyanate, 4,4'-methylenedicyclohexyl diisocyanate, 1,5-tetrahydronaphthylene diisocyanate and benzene triisocyanate. For the highest degree of whiteness retention in the products of this invention, it is preferred that the coupling diisocyanate, if any, be free of NCO groups attached to an aromatic nucleus.

The polymeric glycol is provided with terminal isocyanate groups by a "capping" reaction with a stoichiometric excess of a polyisocyanate component $R(NCO)_y$, wherein $y$ is 2 to 4. Preferably, this component is a diisocyanate, and $y$ is 2. As indicated hereinbefore, at least 80 mol percent of the radicals R derived from the "capping" diisocyanate must be the 2,5-diisopropyl-p-xylene radical. Up to 20 mol percent of the "capping" diisocyanate may be a different diisocyanate such as p,p'-methylenediphenyl diisocyanate, but it is preferred that any aromatic rings present are not attached directly to the isocyanate groups.

Specific examples of diisocyanates other than 2,5-diisopropyl-p-xylylene diisocyanate suitable for constituting up to 20 percent of the total "capping" polyisocyanate component are p,p'-phenylenediethyl diisocyanate (p-bis(isocyanatoethylbenzene), m-xylylene diisocyanate, hexahydro-m-xylylene diisocyanate, hexahydro-p-xylylene diisocyanate, 1,3-cyclohexylene diisocyanate, 1,2-cyclobutylenedimethyl diisocyanate, 1,4-cyclohexylene diisocyanate, 3,3'- and 4,4'-dicyclohexylene diisocyanates, 4,4-methylenedicyclohexyl diisocyanate, 4,4'-bis(isocyanatomethyl)-bicyclohexyl, 4,4'-bis(isocyanatomethylcyclohexyl)methane, tetramethylene diisocyanate, pentamethylene diisocyanate, and hexamethylene diisocyanate.

For the capping reaction between a polyisocyanate and a polymeric glycol, a catalyst is useful to shorten the reaction time but is not essential in carrying out this reaction. Conventional catalysts which accelerate the reaction of isocyanate and hydroxyl groups include tertiary amines, such as triethylenediamine, and various organometallic compounds, such as dibutyltin dilaurate.

The isocyanate-terminated polymer is reacted with a chain-extender for preparation of the segmented polymer. The principal classes of suitable chain-extenders are (a) the non-aryl organic diamines, such as ethylene diamine, bis(4-aminocyclohexyl)methane, m-xylylene diamine; (b) hydrazone; (c) dihydrazides, such as carbohydrazide and the dihydrazides of oxalic and adipic acids; (d) water; and (e) piperazines, such as piperazine, 2,5-dimethylpiperazine and 1,4-diaminopiperazine. The organic diamines and dihydrazides may contain heteroatoms and other functional groups which are less reactive with NCO than hydroxyl. When water is used as chain-extender, $p$ in the formula is zero; otherwise, $p$ has a value of 1. Preferably, the chain-extender is chosen such that in a separate reaction with the polyisocyanate used in the capping reaction it will produce a nitrogen-containing polymer having a melting point above about 200° C. in its fiber-forming molecular-weight range. The preferred segmented polymers will have recurring units which contain from about 50% to about 95% by weight of soft segments and 5 to 50% by weight of hard segments as above defined. The preferred chain-extenders for the present invention are the organic diamines. A plurality of chain-extenders may be used. In such cases, the compounds may be reacted with the isocyanate-terminated polymer as a mixture, or the chain-extenders may be reacted sequentially in any order, as desired. The Q groups in the formula may differ when more than one chain-extender is employed.

It should be apparent that the length of the segment containing the chain-extender may be regulated by adding additional amounts of monomeric diisocyanate together with the chain-extender during the chain-extension reaction. When no unreacted monomeric diisocyanate is present during the chain-extension, the length of this segment will be at a minimum, and $q$ in the formula will be 1. When the chain-extender is an organic diamine, no catalyst need be present during the chain-extension reaction. If the chain-extender is water, catalysts of the aforementioned types may be used to shorten the reaction time. If a catalyst has been used for the capping reaction, no additional quantity is generally necessary for the chain-extension reaction. In order to obtain the desired molecular weight of the segmented polymer, a small amount of a chain-terminator, e.g., diethylamine, may also be included in the chain-extension reaction, as is well known to those skilled in the art.

The segemented polymers of this invention may be prepared by known polymerization techniques. They are preferably made by solution polymerization, which involves dissolving the reactants, i.e., the isocyanate-terminated polymer and chain-extender, in separate portions of a suitable solvent which also serves as a solvent for the resulting segmented polymer. The two solutions are then mixed and stirred for a period of time ranging from a few minutes up to several hours at a temperature between about 0° and about 100° C. During this time the viscosity increases and the polymer may be separated and purified according to known methods. Suitable solvents for the polymerization reaction include N,N-dimethylformamide, N,N-dimethylacetamide, N-methylpyrrolidone, hexamethylphosphoramide, dimethyl sulfoxide, and tetramethylene sulfone.

One advantage of preparing the polymers in a solvent is that the solution may be used directly for the spinning of elastic filaments. The filaments may be obtained by conventional procedures, including dry-spinning and wet-spinning. Shaping and polymerization may also be combined into a single step by the process described in Koller U.S. Re. 24,689 and generally known as chemical-spinning. The properties of the filaments may be improved by a cold-drawing operation, for example, at draw ratios from about 2× to about 10×.

The segmented polymers most useful for elastic-filament applications are those having an inherent viscosity above 0.5. Inherent viscosity refers to the value of the expression $$\frac{\ln\left(\frac{\eta}{\eta_o}\right)}{c}$$

in which $\eta$ is the viscosity of a dilute solution of the polymer at 25° C., $\eta_o$ is the viscosity of the solvent (hexamethylphosphoramide) in the same units and at the same temperature, and $c$ is 0.5, the concentration in grams of the polymer per 100 ml. of solution.

The elastic filaments composed of the segmented polymers described herein may have a substantially linear polymeric structure, or they may be cross-linked to some extent. The term "substantially linear" is not intended to exclude polymers which have branches extending out from the main polymer chain. Cross-linked products may be obtained by using reactants with a functionality of more than two, but this is generally less satisfactory since an excessive degree of cross-linking interferes with the shaping of the filaments. Cross-linked filaments may be prepared directly by the process of chemical spinning using reactants having a functionality of more than two, e.g., by the process disclosed in the aforementioned Koller reissue patent. Alternatively, the substantially linear filaments may be cross-linked by conventional methods after shaping, such as by heating with an excess of organic diisocyanate. Typical reactants that may, for example, be used as a part or all of the chain-extender to provide some degree of cross-linking, include diethylene triamine, trimethylol propane and glycerine. The preferred products of the invention will have no more than one cross-link for each 2,000 molecular weight portion of the polymer chain in order to achieve the benefits of this invention.

Among the numerous modifications which are possible, it will be apparent that the elastic fibers can be provided to contain common additives such as dyes, pigments, antioxidants, delusterants, antistatic agents, U.V. stabilizers and the like by inclusion of such with the polymer prior to fiber formation or be incorporated by other suitable treatments. It will be further understood that although the filament-forming component of the elastic fibers should preferably consist essentially of polymers having recurring units as defined by the formulae above, nevertheless the invention contemplates the use of polymer mixtures which include, in part, other conventional polymers.

The diisocyanate and diamine of this invention, that is, 2,5-diisopropyl-p-xylylene diisocyanate and 2,5-diisopropyl-p-xylylenediamine are prepared from the corresponding dichloride, which is obtained by the conventional bischloromethylation of p-diisopropylbenzene. The diisocyanate is obtained from 2,5-diisopropyl-p-xylylene dichloride by reaction with silver cyanate. The diamine is obtained by reaction of the dichloride with ammonia. Alternatively, the diisocyanate may be obtained from the diamine by the conventional reaction with phosgene, and the diamine may be obtained by hydrolysis of the diisocyanate. The preparation of these compounds is illustrated in the following examples.

EXAMPLE A

A mechanically stirred mixture of 13 g. (0.05 mole) of 2,5-diisopropyl-p-xylylene dichloride; 30 g. (0.2 mole) of silver cyanate and 100 ml. of anhydrous xylene is heated to 130° C. during the course of about 0.5 hr. Between 125–130° C. a slight color change occurs. The reaction mixture is stirred at 115–125° C. for an additional period of 0.5 hr., is filtered and the filter cake is washed with benzene at 78° C. The filtrate is concentrated and the residue is distilled, the fraction boiling at 150–160° C./0.2–0.5 mm. being collected. The distillate is crystallized from ether petroleum ether to give 5.5 g. (40%) of colorless crystals, M.P. 88–90° C. Two additional crystallizations give 2,5-diisopropyl-p-xylylene diisocyanate melting at 91.5–92.5° C. The n.m.r. spectrum of a solution of the diisocyanate in $CDCl_3$ shows four types of protons at 7.32 (singlet, aromatic), 4.52 (singlet, methylene), 3.14 (heptet, tertiary) and 1.27 (doublet, methyl), p.p.m. in the ratio of 1:2:1:6, respectively, with tetramethylsilane as internal standard.

*Analysis.*—Calculated for $C_{16}H_{20}O_2N_2$ (percent): C, 70.56; H, 7.40; N, 10.29. Found (percent): C, 70.75; H, 7.26; N, 9.91.

EXAMPLE B

A mixture of 52 g. (0.2 mole) of 2,5-diisopropyl-p-xylylene dichloride, 80 g. (0.53 mole) of silver cyanate and 250 ml. of anhydrous dioxane is stirred mechanically at 100–103° C. for a total of 45 minutes. Additional 5-g. portions of silver cyanate are added at the end of 20 and 30 minutes. The reaction mixture is filtered, the filter cake is washed with hot dioxane, and the filtrate is evaporated to dryness under reduced pressure. The residue is distilled, B.P. 150–160° C./0.2–0.5 mm., and the distillate is crystallized from ether-hexane. The yield of colorless crystals of 2,5-diisopropyl-p-xylylene diisocyanate is 50 g. (92%), M.P. 92–93° C. A sample sublimed at 0.01 mm. melts at the same temperature.

EXAMPLE C

A solution of 52 g. (0.2 mole) of 2,5-diisopropyl-p-xylylene dichloride in 200 ml. of tetrahydrofuran is injected in 8 portions during the course of 2.5 hours into 200 g. of ammonia at 75° C. The reaction is continued for an additional period of 9 hours. After cooling, the excess ammonia is bled off slowly and the tetrahydrofuran removed using a Rinco evaporator. The solid residue is dissolved in a small volume of water, and excess solid potassium hydroxide is added. The mixture is extracted six times with ether and the combined ethereal extracts are dried over solid potassium hydroxide. Concentration and distillation yields 15 g. 34% of diamine, B.P. 120–140° C./0.2–0.4 mm. Redistillation of the 2,5-diisopropyl-p-xylyenediamine yields a product, B.P. 110° C./0.1 mm., that solidifies on standing at room temperature, M.P. 37–39° C.

Analysis.—Calculated for $C_{14}H_{24}N_2$ (percent): C 76.31; H, 10.98; N, 12.71. Found (percent): C, 76.47; H, 10.86; N, 12.82.

The 2,5-diisopropyl-p-xylene diisocyanate of this invention is particularly useful in the preparation of spandex filaments that have a combination of excellent whiteness retention and superior power. The segmented polyurethanes display good solubility, thereby facilitating solution-spinning of filaments. The elastic filaments, particularly in the bare or uncovered state, are useful in the manufacture of elastic fabrics of all types.

The presence of the two isopropyl groups in the 2,5-orientation on the ring system of the diisocyanate of this invention is a critical factor in achieving the high power for the elastic filaments.

The segmented polyurethanes of this invention will be further illustrated by the following examples in which parts and percentages are by weight unless otherwise specified. The terms $P_{100}$ and $P_{200}$ refer to the fifth-cycle, unload values of stress ("power") at the elongations indicated by the respective subscripts, after cycling as follows: yarn is cycled five times between zero and 300% extension at a constant rate of elongation, i.e., 800% per minute. The sample is held at the maximum extension for one half-minute after the fifth extension to permit stress decay. Stress, on unloading from this last extension, is measured and is expressed in terms of grams per denier at the elongation indicated by the respective subscript. At the end of the fifth cycle, the length of the yarn is measured after being allowed to recover for one half-minute, and is used in the determination of "set" described hereinafter. The length of yarn is measured between two marks placed on the yarn before testing. This technique is used to avoid error caused by slippage of the yarn sample in the clamps of the testing instrument.

The term "set" refers to the increase in length of the sample as a result of the 5-cycle test described above and is expressed as percent of original length. The terms "elongation" and "tenacity" refer, respectively, to the percent elongation at break and the stress measured in grams at the break, this stress being divided by the initial fiber denier before cycling.

EXAMPLE 1

A mixture of 39.8 parts of 2,5-diisopropyl-p-xylylene diisocyanate and 150.0 parts of polytetramethylene ether glycol having a molecular weight of 2053 is heated and stirred under nitrogen atmosphere at 85° C. until it becomes homogeneous. Then it is kept at 90–95° C. for 2.5 hours with stirring to yield an isocyanate-terminated polyether which contains 3.15% NCO. A solution is formed by dissolving 17.9 parts of the isocyanate-terminated polyether in 71.6 parts of hexamethylphosphoramide to give 20% solids. To this solution is added with stirring at ambient temperature 7 parts of a solution obtained by dissolving 5.7 parts of 1,3-diaminocyclohexane (54/46 ratio of cis-trans isomers) in 45 parts of hexamethylphosphoramide. The segmented polymer has an inherent viscosity of 1.97.

Films cast from the viscous polymer solution (after drying and one hour relaxed boil-off) possess the following physical properties: tenacity—.47 g.p.d.; elongation—592%; set—12%; $P_{100}$—.033 g.p.d.; $P_{200}$—.062 g.p.d.; stress decay—18%.

EXAMPLE 2

A mixture of 2035 parts of polytetramethylene ether glycol having a molecular weight of 2035 and 544 parts of 2,5-diisopropyl-p-xylylene diisocyanate is heated with stirring under nitrogen atmosphere at 75° C. until it becomes homogeneous. Dibutyltin dilaurate (.06 parts) is added and the mixture is then heated for 45 minutes at 70–75° C. to yield an isocyanate-terminated polyether which contains 3.25% NCO. A solution is formed by dissolving 18.2 parts of the isocyanate-terminated polyether in 72.8 parts of dry N,N-dimethylacetamide to give 20% solids. To this solution is added with stirring at ambient temperature 6.6 parts of a solution obtained by dissolving 3.7 parts of 1,3-propanediamine in 43.2 parts of N,N-dimethylacetamide. Viscosity of the solution increases rapidly and at this point .026 part of diethylamine is added as molecular weight regulator. Before films are cast 30–40 parts of hexamethylphosphoramide is added. Films, after they are dried and boiled-off relaxed, possess the following physical properties: tenacity—.31 g.p.d.; elongation—570%; set—24%; $P_{100}$—.033 g.p.d.; $P_{200}$—.074 g.p.d.; stress decay—17%.

EXAMPLE 3

A mixture of 103.2 parts of polytetramethylene ether glycol having a molecular weight of 2063 and 27.2 parts of 2,5-diisopropyl-p-xylylene diisocyanate is heated with stirring under nitrogen atmosphere at 70° C. until the mixture becomes homogeneous. The contents of the flask is cooled to 60° C. and .06 parts of dibutyltin dilaurate is added. Temperature of the mixture rises spontaneously to 81° C. The contents of the flask is cooled to 70° C. and then the temperature is maintained at 70–75° C. for 45 minutes to yield an isocyanate-terminated polyether which contains 3.02% NCO. A solution is formed by dissolving 20.6 parts of the isocyanate-terminated polyether in 82.4 parts of N,N-dimethylacetamide to give 20% solids. To this solution is added with stirring at ambient temperature 7 parts of a solution obtained by dissolving 7.9 parts of 4,4-dimethylheptamethylenediamine in 39.6 parts of N,N-dimethylacetamide. The segmented polymer has an inherent viscosity of 2.69. Films, after they are dried and boiled-off relaxed, possess the following physical properties: tenacity—.34 g.p.d.; elongation—536%; set—20%; $P_{100}$—.034 g.p.d.; $P_{200}$—.065 g.p.d.; stress decay—21%.

EXAMPLE 4

A mixture of 250 parts of polytetramethylene ether glycol having a molecular weight of 2000 and 68 parts of 2,5-diisopropyl-p-xylylene diisocyanate is heated with stirring under nitrogen atmosphere at 70° C. until the mixture becomes homogeneous. The solution is then cooled to 55° C. and .06 parts of dibutylin dilaurate is added. The temperature of the solution is maintained at 70–75° C. for 60 minutes to yield an isocyanate-terminated polyether. A solution of the said isocyanate-terminated polyether is formed in N,N-dimethylacetamide at 25% solids. To this solution is added with stirring at ambient temperature a solution obtained by dissolving 19.2 parts of $\alpha,\alpha,\alpha',\alpha'$-tetramethyl p-xylylene diamine in 76 parts of N,N-dimethylacetamide until internal malachite green indicator end point (green when isocyanate present, colorless when on amine side). The segmented polymer has an inherent viscosity 0.99.

This solution is dry spun in the usual way to produce elastic filaments. The filaments are boiled-off in a relaxed condition for one hour and are allowed to dry at room temperature. The filaments possess the following physical properties: tenacity—.58 g.p.d.; elongation—503%; set—15%; $P_{100}$—.041 g.p.d.; $P_{200}$—.008 g.p.d.; stress decay—22%.

EXAMPLE 5

A mixture of 202.7 parts of polycaprolactone (Union Carbide's Niax Polyol D–560 having a molecular weight of 2027) and 54.4 parts of 2,5-diisopropyl-p-xylylene diisocyanate is heated with stirring under nitrogen atmosphere at 75°–80° C. until the mixture becomes homogeneous. The solution is then cooled to 65° C. and .06 parts of dibutyltin dilaurate is added. The temperature of the solution is maintained at 70–75° C. for 60 minutes to yield an isocyanate-terminated polycaprolactone. A solution is formed by dissolving 15.9 parts of the isocyanate-terminated polycaprolactone in 73.7 parts of N,N-dimethylacetamide to give 20% solids. To this solution is added with stirring at ambient temperature 5.8 parts of a solution obtained by dissolving 5.7 parts of 1,3-diaminocyclohexane (54/46 ratio of cis/trans isomers) in 41.4 parts of N,N-dimethylacetamide. The segmented polymer has an inherent viscosity of 1.27.

Films cast from the viscous solution are dried and boiled-off one hour in a relaxed condition. After air drying they possess the following physical properties: tenacity—.45 g.p.d.; elongation—648%; set—60%; $P_{100}$—.005 g.p.d.; $P_{200}$—.031 g.p.d.; stress decay—32%.

EXAMPLES 6–14

In the following examples, segmented polymers are prepared by carrying out the polymerization reactions in hexamethylphosphoramide or in dimethylacetamide under conditions similar to those used in preceding examples.

The polymer solutions from Examples 6 through 14 can be spun to yield strong, nondiscoloring elastic filaments. Filament properties are easily approximated by casting films from the polymer solutions, which are then thoroughly dried and cut into thin strips. The respective samples prepared from tetramethylene ether glycol (about 2000 molecular weight) and 2,5-diisopropyl-p-xylylene diisocyanate have the following physical properties:

R is an organic radical containing more than one carbon atom and free from substituents reactive with isocyanate, at least 80 mol percent thereof in said recurring units being divalent radicals of the formula:

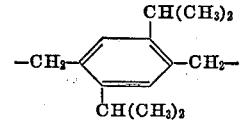

$m$ is an integer selected from the class consisting of zero and small positive integers, i.e., from 1 to about 8;

$n$ and $q$ are small positive integers, i.e., from 1 to about 8; and $p$ is an integer selected from the class consisting of zero and 1.

2. A polyurethane as defined in claim 1 wherein the segment

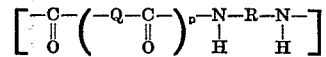

comprises the repeating unit of a polymer which in its fiber-forming molecular weight range has a melting point above about 200° C.

3. A polyurethane as defined in claim 2 wherein the recurring units contain from about 50% to 95% by weight of the segments:

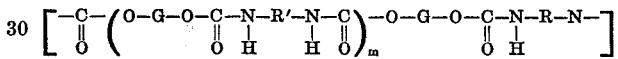

| Example No. | Chain extender | Stress decay (percent) | Set (percent) | $P_{100}$ (g.p.d.) | $P_{200}$ (g.p.d.) | Tenacity (g.p.d.) | Elongation (percent) |
|---|---|---|---|---|---|---|---|
| 6 | m-Xylylene diamine | 23 | 19 | .030 | .068 | .53 | 591 |
| 7 | Ethylene diamine | 19 | 22 | .033 | .074 | .46 | 598 |
| 8 | Hydrazine | 14 | 19 | .036 | .079 | .44 | 606 |
| 9 | Water | 15 | 22 | .030 | .069 | .41 | 614 |
| 10 | 2,5-diisopropyl p-xylylene diamine | 21 | 24 | .025 | .068 | .38 | 534 |
| 11 | 1,4-cyclohexylene diamine (50% cis) | 16 | 12 | .030 | .054 | .40 | 604 |
| 12 | Thiocarbohydrazide | 20 | 14 | .039 | .079 | .35 | 479 |
| 13 | 1,5-pentamethylene diamine | 18 | 29 | .031 | .074 | .31 | 538 |
| 14 | 1,6-hexamethylene diamine | 19 | 31 | .030 | .072 | .36 | 565 |

I claim:

1. A segmented polyurethane consisting essentially of recurring units of the formula:

and from about 5% to 50% by weight of the segments:

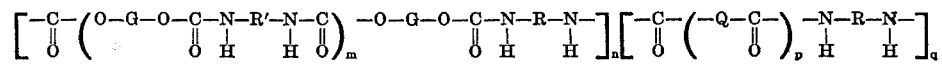

wherein

G is a long chain polymeric radical free from substituents reactive with isocyanate and having a molecular weight of at least 600;

R' is an organic radical containing more than one carbon atom and free from substituents reactive with isocyanate;

Q is a radical obtained by the removal of one hydrogen atom from each of two functional groups of a polyfunctional compound selected from the class consisting of organic polyamines containing at least two $NH_2$ groups each attached to separate carbon atoms not part of a benzenoid ring, hydrazine, hydrazides containing at least two —$NHNH_2$ groups attached to carbonyl, and piperazines containing two >NH groups or two >N—$NH_2$ groups;

4. A polyurethane as defined in claim 3 having an inherent viscosity above 0.5.

5. A polyurethane as defined in claim 4 wherein G is the radical remaining after removal of the terminal hydroxyl groups from polytetramethylene ether glycol.

6. A polyurethane as defined in claim 5 wherein substantially 100 mol percent of the radicals R are divalent radicals of the formula:

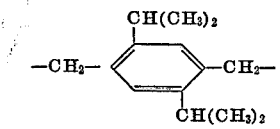

7. A polyurethane as defined in claim 5 wherein Q is a radical obtained by removal of one hydrogen atom from each amino group of an organic diamine.

8. An elastic filament comprising a segmented polyurethane as defined in claim 1.

9. An elastic filament comprising a segmented polyurethane as defined in claim 4.

10. An elastic filament comprising a segmented polyurethane as defined in claim 7.

References Cited

UNITED STATES PATENTS 3,507,834   4/1970   Wittbecker _____ 260—75

FOREIGN PATENTS 808,574   2/1959   Great Britain _____ 260—77.5

DONALD E. CZAJA, Primary Examiner

M. J. WELSH, Assistant Examiner

U.S. Cl. X.R.

260—75 NT, 453 AR, 453 AL, 563 R